(12) United States Patent
Allen et al.

(10) Patent No.: US 12,098,836 B2
(45) Date of Patent: Sep. 24, 2024

(54) DIFFUSED LIGHTING ASSEMBLIES AND METHODS OF INSTALLATION ON MARINE VESSELS AND LAND VEHICLES

(71) Applicant: Research & Design Innovations, LLC, Branford, CT (US)

(72) Inventors: Donald Terry Allen, Madison, CT (US); Kevin Hannula, Bloomington, IN (US); Ryh Yeh, Virginia Beach, VA (US)

(73) Assignee: Research & Design Innovations, LLC, Branford, CT (US)

( * ) Notice: Subject to any disclaimer, the term of this patent is extended or adjusted under 35 U.S.C. 154(b) by 0 days.

(21) Appl. No.: 18/164,955

(22) Filed: Feb. 6, 2023

(65) Prior Publication Data

US 2023/0250950 A1  Aug. 10, 2023

Related U.S. Application Data

(60) Provisional application No. 63/308,449, filed on Feb. 9, 2022.

(51) Int. Cl.
*F21V 31/00* (2006.01)
*F21S 4/26* (2016.01)

(52) U.S. Cl.
CPC ............ *F21V 31/005* (2013.01); *F21S 4/26* (2016.01)

(58) Field of Classification Search
CPC . F21V 31/005; F21S 4/26; F21S 43/14; F21S 43/15; F21S 43/26; F21S 45/50; F21S 4/22; F21W 2107/10; F21W 2107/20; B60Q 1/2623; B63B 45/04; F21Y 2107/70; F21Y 2103/10; F21Y 2115/10
See application file for complete search history.

(56) References Cited

U.S. PATENT DOCUMENTS

| | | | | |
|---|---|---|---|---|
| 5,438,804 | A * | 8/1995 | Reum | F21S 4/20 47/33 |
| 6,186,645 | B1 * | 2/2001 | Camarota | F21S 8/032 362/240 |
| 8,376,576 | B2 * | 2/2013 | Sloan | F21V 31/005 362/555 |
| 9,695,991 | B2 | 7/2017 | Camarota | |
| 9,909,719 | B2 | 3/2018 | Camarota | |
| 10,663,125 | B2 * | 5/2020 | Hartman | F21S 4/20 |
| 10,845,013 | B2 * | 11/2020 | Tolen | F21V 23/006 |
| 11,655,946 | B1 * | 5/2023 | Zhang | F21V 31/04 362/217.01 |

(Continued)

*Primary Examiner* — Tsion Tumebo
(74) *Attorney, Agent, or Firm* — DeLio Peterson & Curcio LLC; David R. Pegnataro

(57) ABSTRACT

A light assembly and method for installing the same on a surface in a wet or outdoor environment, e.g., on a marine vessel or land recreational or other vehicle, such as marine light assemblies, without need for specialized tools or mounting assemblies. The light assembly comprises a flexible diffusion housing having a first portion and a second portion, with a groove therebetween. A light element is disposed within the interior of the first portion, and light produced by the light element is diffused by the first and second portions prior to emission outwardly from the second portion. After installation, only the second portion of the light assembly is visible on the marine vessel or land recreational surface.

14 Claims, 13 Drawing Sheets

(56) References Cited

U.S. PATENT DOCUMENTS

| | | | |
|---|---|---|---|
| 2005/0231947 A1* | 10/2005 | Sloan | G09F 9/33 |
| | | | 362/235 |
| 2008/0192463 A1* | 8/2008 | Fan | F21S 4/26 |
| | | | 362/219 |
| 2010/0061095 A1* | 3/2010 | Hoffmann | F21S 4/26 |
| | | | 362/249.02 |
| 2018/0080637 A1* | 3/2018 | Didone' | F21S 8/033 |
| 2021/0231289 A1* | 7/2021 | Pruitt | F21V 3/02 |
| 2022/0146061 A1* | 5/2022 | Koivisto | F21V 19/0045 |

* cited by examiner

DIFFUSED LIGHTING ASSEMBLIES AND METHODS OF INSTALLATION ON MARINE VESSELS AND LAND VEHICLES

CROSS-REFERENCE TO RELATED APPLICATION

The present application is a non-provisional application that claims priority benefit to a provisional patent application entitled "Method for Installing Protective Covering for LED Light Fixtures," which was filed with the U.S. Patent and Trademark Office on Feb. 9, 2022, and assigned Ser. No. 63/308,449. The entire contents of the foregoing patent application is incorporated herein by reference.

BACKGROUND OF THE INVENTION

Field of the Invention

The present invention relates to lighting assemblies utilizing light sources such as light-emitting diodes (LEDs) in a protective flexible housing on a surface in wet or outdoor environments, such as on a surface of a marine vessel or land recreational vehicle.

Description of Related Art

While various types of electrical lighting systems have been known and developed throughout the years, LEDs continue to become increasingly popular lighting options. This is in large part due to the many advantages LEDs offer over other electrical lighting systems, such as their low energy consumption, long lifetime, durability, small size, and nanosecond switching times.

Popular applications of LEDs include lighting fixtures which provide functional illumination while simultaneously appealing to consumer aesthetics. LED configurations which are useful for decorative lighting assemblies in both indoor and outdoor applications include rigid LED lights and flexible LED rope lights. Rigid LED lights comprise LEDs conventionally mounted on a rigid material linking the LEDs together both electrically and physically, whereas flexible LED rope lights utilize a series of spaced apart and electrically linked LEDs which are mounted on a flexible printed circuit (FPC).

Flexible LED rope lights (otherwise referred to as "LED strip lights") can be utilized in many applications. One such application is in connection with marine vessels or land recreational vehicles, which are generally exposed to a wet or outdoor environment. LED strip lights may be utilized for staircase and furniture lighting, as well as other applications such as entrance and egress lighting, or other applications within marine vessels or land recreational vehicles.

Despite the numerous practical applications with LED strip lighting, problems may arise in their implementation. Since individual LEDs are effectively unidirectional hard-point light sources, LED strip lighting exhibits areas of incredible illumination ("hot spots") as well as areas of complete darkness ("dark zones"). As a result, lighting pattern irregularities may be displeasing, or create problems in viewing what should otherwise be a properly illuminated object. To combat this problem, LED strip lighting utilizes a diffusion housing to improve the uniformity of the overall light transmission of the lighting strip. In effect, LED "hot spots" are radiated in a number of different directions, thereby scattering light generated by the LED, which would reduce the number of "dark zones" on the LED strip.

While the installation of LED strip lighting without a diffusion housing is relatively simple, conventional diffusion housings for LED strip lighting are often cumbersome and bulky, and often require the usage of a clamping system in order to be properly installed. Frequently, the diffusion housing is not as flexible as the LED strip lighting, creating additional installation issues, particularly in areas having a small navigable working space. Thus, a need exists for LED strip lighting which includes a diffusion housing that is simple to install and can incorporate the flexibility advantages of conventional LED strip lighting technology. Further, a need exists for lighting assemblies utilizing such technologies which can withstand installation in a wet or outdoor environment, e.g., on a marine vessel, land recreational vehicle, or other vehicle.

SUMMARY OF THE INVENTION

Bearing in mind the problems and deficiencies of the prior art, it is therefore an object of the present invention to provide a light assembly which can provide properly diffused light emitting from a surface.

It is another object of the present invention to provide a method of installing light assemblies which is faster, easier, and less costly to install.

A further object of the invention is to provide a light assembly which can be installed on a surface with limited tools and without excess components.

Yet another object of the invention is to provide a light assembly which can be installed on a surface in a wet or outdoor environment without failure.

Still other objects and advantages of the invention will in part be obvious and will in part be apparent from the specification.

The above and other objects, which will be apparent to those skilled in the art, are achieved in the present invention which is directed to a light assembly for installation on a surface in a wet or outdoor environment comprising a flexible diffusion housing comprising a first housing portion, a second housing portion, and a groove therebetween and a light element disposed in a first housing portion interior, wherein light produced by the light element is diffused by the first housing portion and second housing portion and emitted outwardly from the second housing portion.

In some embodiments, the first housing portion interior comprises a cavity extending throughout a length of the first housing portion, and the light element comprises a circuit board having a bottom surface and a top surface with LEDs disposed thereon. The first housing portion may comprise a bottom surface, and the second housing portion may comprise an emission base. The light element may be oriented within the first housing portion interior such that light is produced towards the second housing portion emission base and away from the first housing portion bottom surface. The second housing portion may further comprise a connection flange. In the installed position the connection flange may engage with an exterior of said surface. The diffusion housing groove may be adjacent a slot edge of said surface, and the first housing portion may be within an interior of said surface. The first housing portion may further comprise a resilient registration vertex between a plurality of sloping regions. The resilient registration vertex and the plurality of sloping regions may form a hexagonal cross section of the first housing portion. The light element may comprise an electrical fitment including at least one projection and a limiting flange for forming a detent mechanism with an end of the first housing portion cavity. An opposing end of the cavity may include an endcap comprising a flanged base and at least one projection for forming a detent mechanism with the cavity opposing end. The diffusion housing may be constructed of a material which comprises a transparent, semi-transparent, or semi-opaque material, or may be constructed of a material comprising UV-blocking materials, pigments, or dyes.

The present invention also provides a method of installing a light assembly on a surface in a wet or outdoor environment comprising providing a light assembly comprising a flexible diffusion housing and a light element within a first portion of the flexible diffusion housing. The method further comprises creating a slot on a surface in a wet or outdoor environment, the surface comprising an interior surface and an exterior surface, selecting a section of the light assembly, positioning the light assembly section adjacent the slot, and pressing the light assembly section into the slot such that a selected first portion of the diffusion housing is within the interior surface and a selected second portion of the diffusion housing is on the exterior surface. The method further comprises securing the light assembly section within the slot of the surface.

In one or more embodiments, a connection flange on the selected second portion of the diffusion housing may engage with the exterior surface upon securing the light assembly section within the slot of the surface. Electrical connectors of the light element may be connected to an external power source on the interior surface and may be invisible when viewed from the exterior surface after installation of the light assembly section. The first portion of the diffusion housing may comprise a resilient registration vertex which provides a resilient feedback upon pressing the selected first portion of the diffusion housing into the slot. The resilient registration vertex may further comprise a plurality of sloping regions and the resilient feedback may increase as the selected first portion of the diffusion housing is pressed into the slot and an edge of the slot approaches the resilient registration vertex. The resilient feedback may decrease as the resilient registration vertex of the selected first portion of the diffusion housing is pressed beyond the edge of the slot and into the interior surface. The diffusion housing may comprise a groove between the first portion and the second portion of the diffusion housing, and the diffusion housing groove may be adjacent a slot edge upon securing the light assembly section within the slot of the surface. The method may further comprise applying downward pressure on a top surface of the light assembly in a direction along a length of the light assembly, and securing the length of the light assembly within the slot on the surface. The method may comprise selecting a second section of the light assembly at a light assembly end opposite the light assembly section, positioning the light assembly second section adjacent the slot, pressing the light assembly second section into the slot such that the first portion of the diffusion housing is within the interior surface and a second portion of the diffusion housing is on the exterior surface, and securing the light assembly section within the slot of the surface.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE EMBODIMENT(S)

Figure 1A:
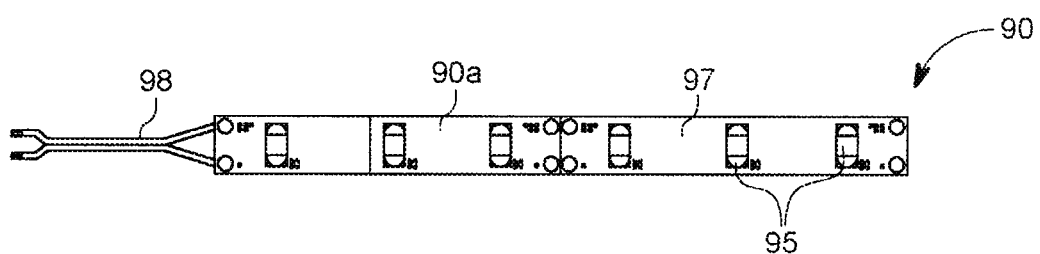
FIG. 1A is a top plan view of a prior art LED strip light.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc., may be used herein to describe various components, these components should not be limited by these terms. These terms are only used to distinguish one component from another. For example, a first element could be termed a second element, and, similarly, a second element could be termed a first element, without departing from the scope of the present invention. As used herein, the singular forms "a", "an" and "the" are intended to include the plural forms as well, unless the context clearly indicates otherwise. Also, as used herein, the term "and/or" includes any and all combinations of one or more of the associated listed items. It will be further understood that the terms "include" and/or "including" when used herein, specify the presence of stated features, steps, operations, elements, and/or components, but do not preclude the presence or addition of one or more other features, steps, operations, elements, components, and/or groups thereof.

Relative terms such as "below," "above," "upper," "lower," "horizontal," "vertical," "top," "bottom," "rear," "front," "side," or the like may be used herein to describe a relationship of one element or component to another element or component as illustrated in the figures. It will be understood that these terms are intended to encompass different orientations of the device in addition to the orientation depicted in the figures.

Additionally, in the subject description, the words "exemplary," "illustrative," or the like are used to mean serving as an example, instance or illustration. Any aspect or design described herein as "exemplary" or "illustrative" is not necessarily intended to be construed as preferred or advantageous over other aspects or design. Rather, use of the words "exemplary" or "illustrative" is merely intended to present concepts in a concrete fashion.

In describing the embodiment of the present invention, reference will be made herein to FIGS. 1-17 of the drawings in which like numerals refer to like features of the invention. While the embodiments of the invention are illustrated with respect to certain features of the lighting assembly, it should be understood that any of the embodiments and/or features thereof illustrated with respect to one embodiment may be utilized with any of the other embodiments and/or features thereof.

The present invention provides a light assembly and method for installing the same in a wet or outdoor environment, e.g., on a marine vessel or land recreational or other vehicle, such as marine light assemblies, without need for specialized tools or mounting assemblies. The apparatus and method of the present invention provide for a light assembly that may be universally employed and is waterproof as well as durable. As such, the present invention provides a useful light source in an otherwise dark environment, as well as an easy and cost-effective method of installing the same on surfaces subjected to wet or outdoor environments.

Figure 1B:
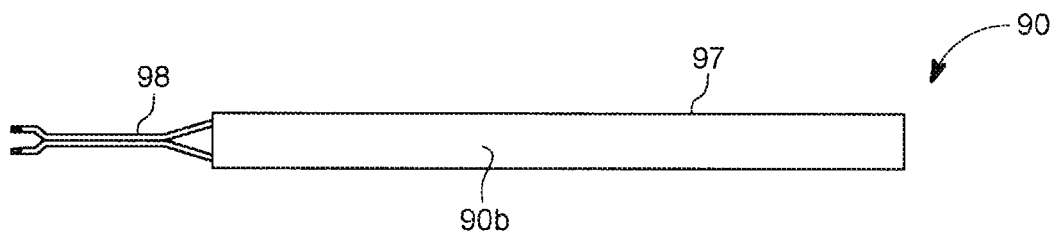
FIG. 1B is a bottom plan view of the LED strip light of FIG. 1A.

FIGS. 1A and 1B depict a prior art LED element 90 comprising a flexible printed circuit (FPC) 97 having a plurality of light emitting diodes (LEDs) 95 mounted thereon and in electrical communication therewith. An electrical connector 98 (commonly referred to as "pigtails") may be disposed on one or more ends of the LED element 90 and may be interconnected with the plurality of LEDs 95 for connection with an external electrical power source. The LED element 90 may further include an adhesive on a portion of the FPC 97 to facilitate mounting of the LED element 90, as well as a removeable protective film covering the adhesive portion to prevent inadvertent sticking and degradation of the adhesive prior to mounting operations of the LED element.

Figure 2:
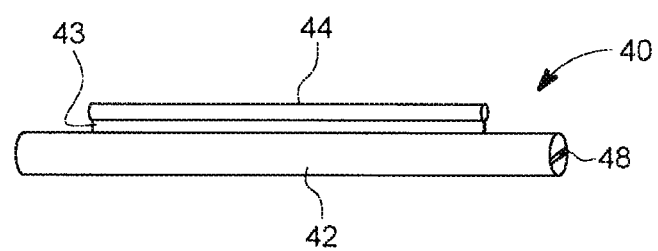
FIG. 2 is a side elevation view of a diffusion housing according to an embodiment of the present invention.

Turning to FIGS. 2-3, a diffusion housing 40 according to an embodiment of the present invention comprises a resilient, flexible housing including a first housing portion 42 including a hollow interior channel or housing cavity 48 disposed at one end of the first housing portion 42 and extending within a portion of the first housing portion 42. During assembly, LED element 90 may be inserted within diffusion housing 40 via housing cavity 48, thereby encapsulating the LED element 90 within the first housing portion 42 to prevent damaging or malfunction of LEDs 95. Diffusion housing 40 may be constructed of a number of different materials, including organic polymers and inorganic synthetic polymers such as rubber, silicone, cellulose, nylon, polyethylene, polyester, epoxy, and combinations thereof. Diffusion housing 40 may be constructed of a transparent, semi-transparent, or semi-opaque material which would allow for varying diffusion qualities of light produced by the LED element 90 within housing cavity 48. The material forming diffusion housing 40 may further include UV-blocking materials, pigments, or dyes resulting in various colored housings, and also resulting in different light diffusion patterns and qualities. The overall shape and structure of the diffusion housing is shown in various figures of the drawings, such as the exemplary diffusion housings of FIGS. 2 and 4A-4C, resulting in cross-sectional geometries which may be at least partially cylindrical, oval, square, rectangular, and the like.

Figure 3A:
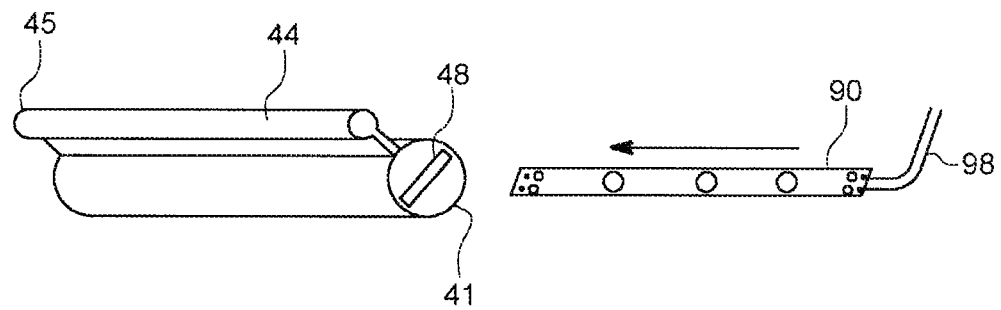
FIG. 3A is a perspective view of the diffusion housing, and LED element prior to insertion, according to an embodiment of the present invention.
Figure 3B:
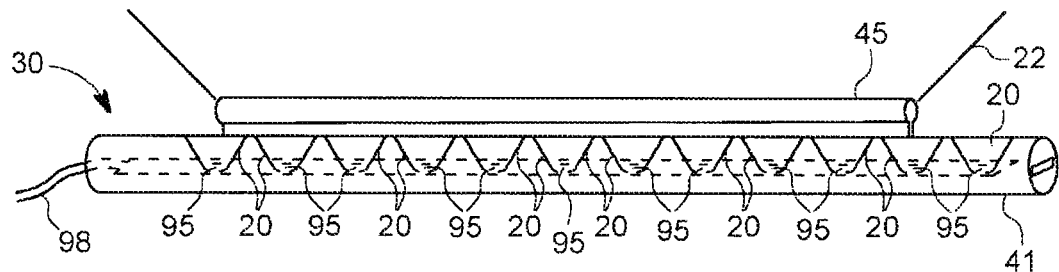
FIG. 3B is a perspective view of an LED fixture according to an embodiment of the present invention during operation.

Diffusion housing 40 additionally comprises a second housing portion 44 extending along at least a portion of first housing portion 42 such that second housing portion 44 is coplanar to first housing portion 42. In some embodiments, second housing portion 44 may be parallel to the first housing portion 42. A connecting member 43 comprises a substantially flat, rectangular material extending between at least a portion of first housing portion 42 and second housing portion 44, connecting the two housing portions 42 and 44 of diffusion housing 40. While the connecting member 43 shown in FIGS. 2, 3A, and 3B is coupled to the housing portions 42, 44 along the rectangular width of the connecting member 43, such connection is for exemplary purposes only, and other sizes, shapes, and connecting configurations of the connecting member 43 which would connect the housing portions 42, 44 to form diffusion housing 40 are not meant to be precluded.

Figures 4B, 4C:
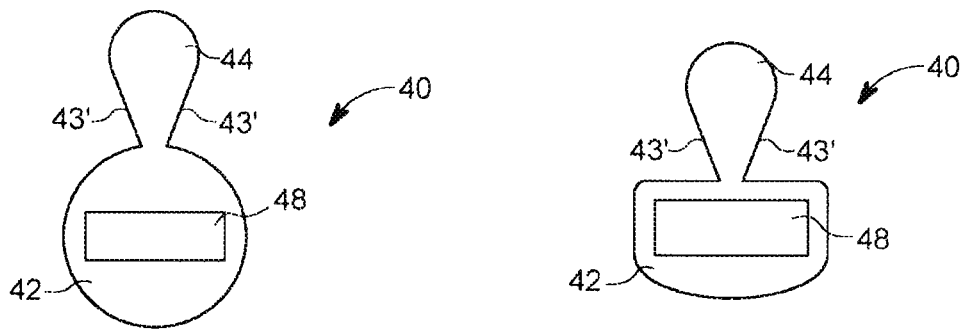
FIG. 4B is a front elevation view of the diffusion housing according to an embodiment of the present invention.
FIG. 4C is a front elevation view of the diffusion housing according to an embodiment of the present invention.
Figure 4A:
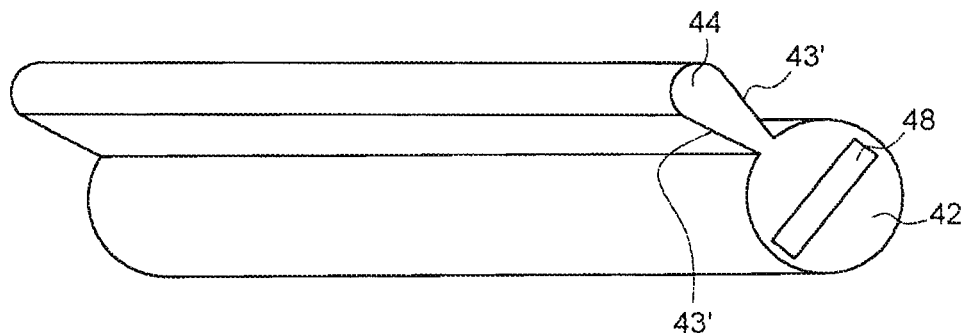
FIG. 4A is a perspective view of a diffusion housing according to an embodiment of the present invention.
Figure 5:
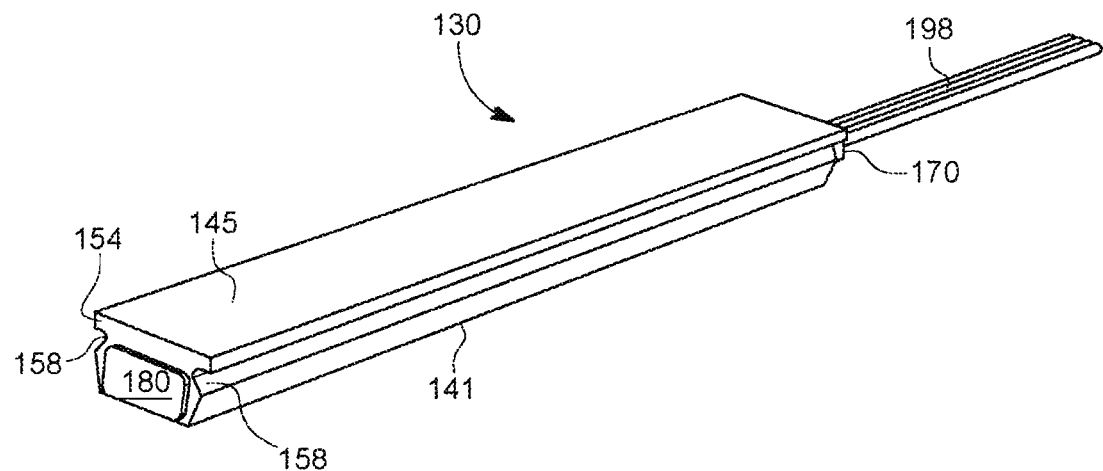
FIG. 5 is a perspective view of a light assembly according to an embodiment of the present invention.
Figure 6:
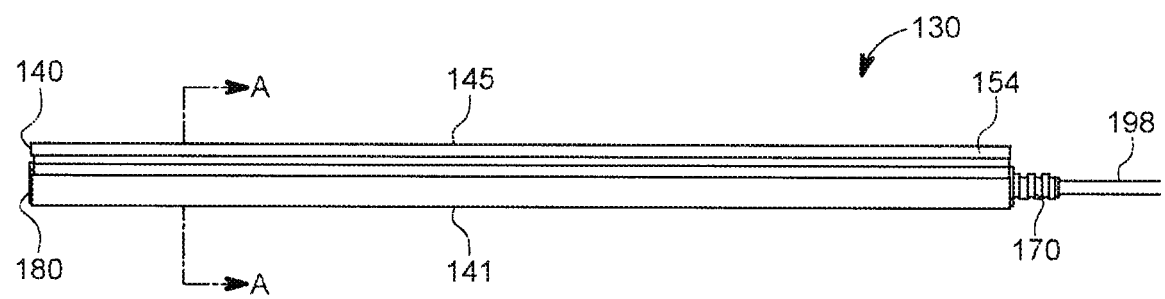
FIG. 6 is a side elevation view of the light assembly according to FIG. 5.

In some embodiments, like those depicted in FIGS. 4A-4C, second housing portion 44 comprises a tapered section 43' coupling the second housing portion 44 to the first housing portion 42. As illustrated, second housing portion 44 with tapered section 43' comprises a cross-sectional geometry similar to a teardrop, connecting the first housing portion 44 at the most attenuated or wedge-like segment of tapered section 43'. The overall cross-sectional footprint of the diffusion housing 40 thus can be such that both housing portions 42, 44 are in coplanar alignment, further facilitating the method of installing the diffusion housing within a marine vessel or recreational vehicle, as described in further detail below.

An embodiments of assembling diffused-lighting light assembly 30 comprises selecting a diffusion housing 40 and LED element 90 in accordance to the embodiments described above. LED element 90 may then be inserted within the housing cavity 48 such that the LED element surface 90a having the plurality of LEDs 95 faces the diffusion housing top surface 45, while LED element surface 90*b* faces diffusion housing bottom surface 41. As shown in FIG. 3, insertion of LED element 90 is such that element end opposite electrical connector 98 is inserted first, and provides a limit to insertion such that electrical connector 98 may remain outside the diffusion housing 40, providing additional accessibility for the electrical connector 98 with the external electrical power source. An endcap (not shown) may then be placed on the end(s) of the diffusion housing 40 to seal the LED element 90 within housing cavity 48, protecting the LED element 90 from damage or malfunction due to moisture, UV-rays, and the like. Alternately, access to the LED element 90 within housing cavity 48 may be prevented by way of an adhesive, such as epoxy, on the housing ends or by melting the end(s) of the diffusion housing 40 to seal and prevent access to the LED element 90 within the diffusion housing 40.

After assembly, electrical connectors 98 of the light assembly 30 may be connected to an external power source for operation of the LEDs 95. Upon a supply of electrical energy to the LED element 90, the plurality of LEDs 95 will begin to emit light rays 20 within the interior of the diffusion housing first housing portion 42, as shown in FIG. 3B. Since the LEDs of the LED element 90 are unidirectional in nature, incident light rays 20 are radiated outwardly from the LED element surface 90*a*, emitting incident light rays 20 within the first housing portion 42 in a direction towards diffusion housing top surface 45. Incident light rays 20 emitted are diffused within the first housing portion 42, and further diffused throughout the second housing portion 44, projecting diffused light rays 22 from the exterior surface of the diffusion housing 40. Advantageously, the diffusion housing 40 of the present invention is able to provide diffused light radiating from the second housing portion 44 in an even distribution, significantly reducing the number of "hot spots" and "dark zones" characteristic of illumination produced by LEDs. Furthermore, the overall construction of the light assembly 30 generates an effective and well-scattered ambient light source for incorporation on a surface of a marine vessel or recreational vehicle.

Figure 7:
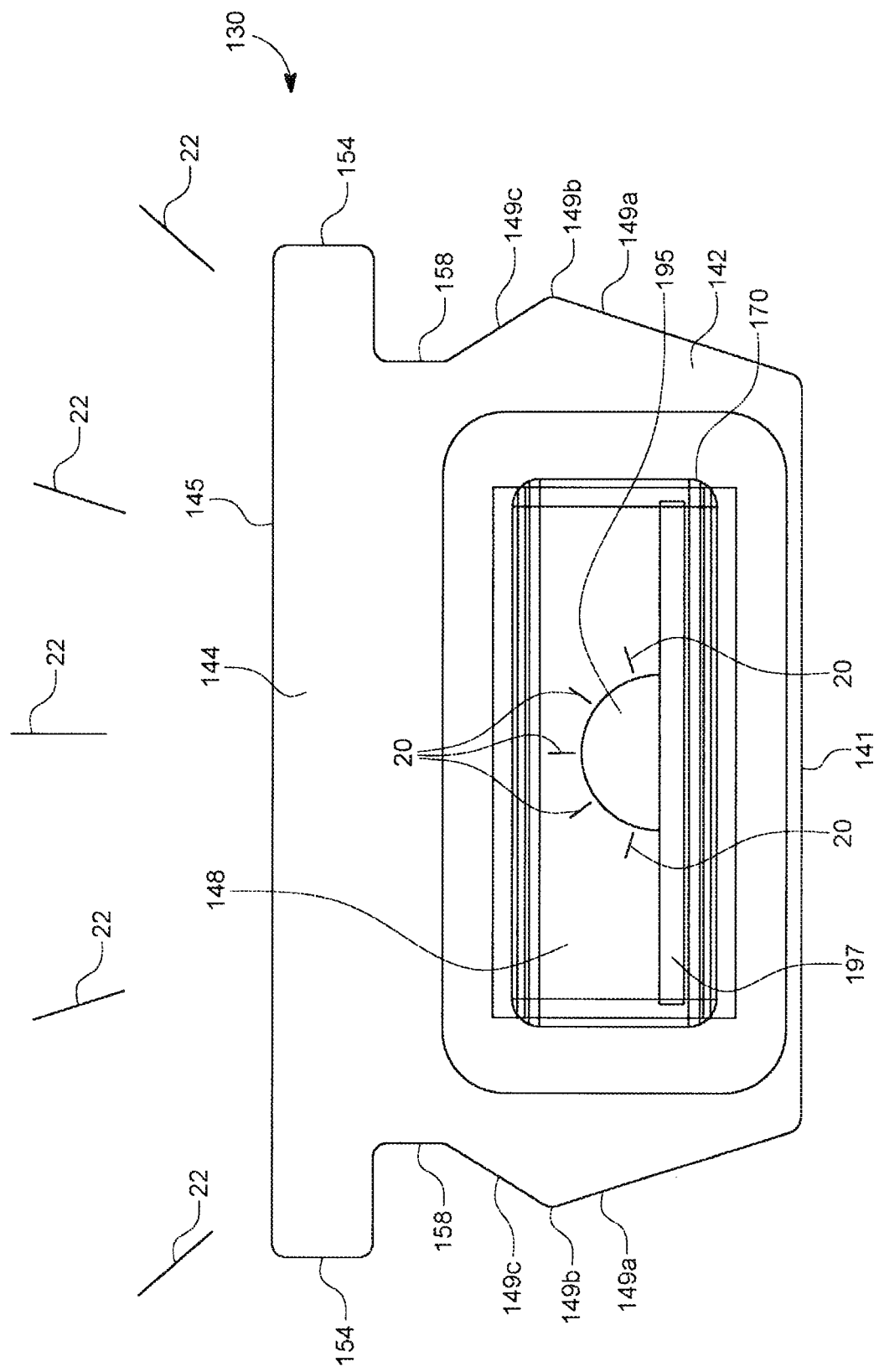
FIG. 7 is a cross sectional view of the light assembly according to FIG. 6, along lines A-A.
Figure 8:
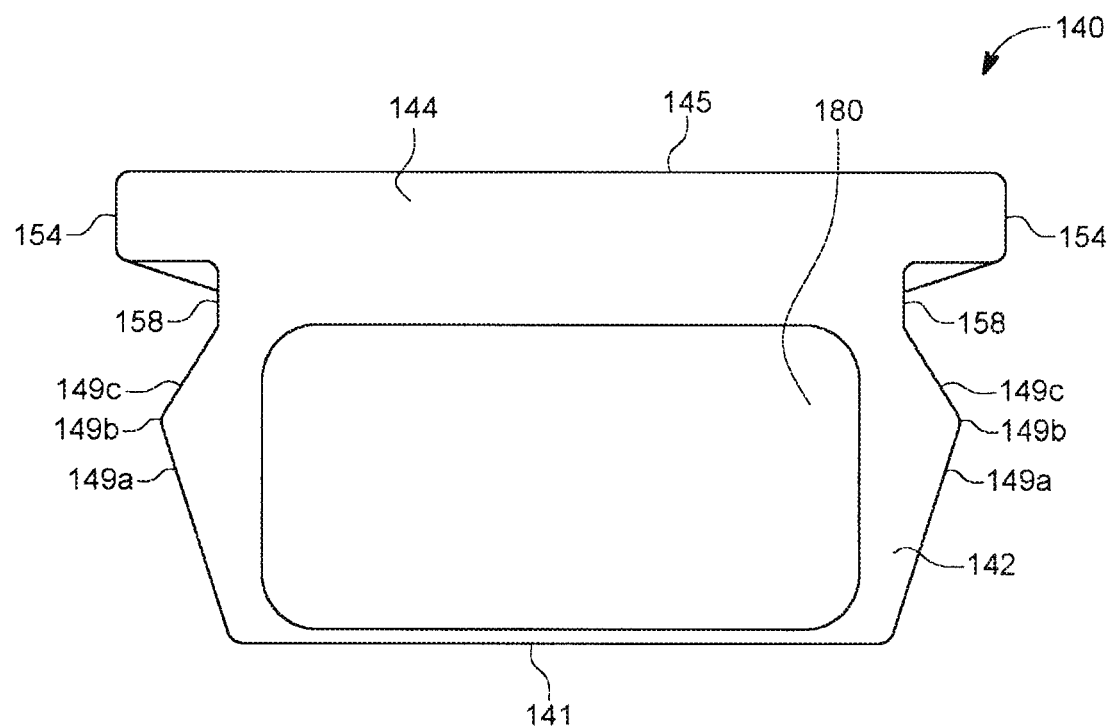
FIG. 8 is a front elevation view of the light assembly according to FIG. 5.
Figure 9:
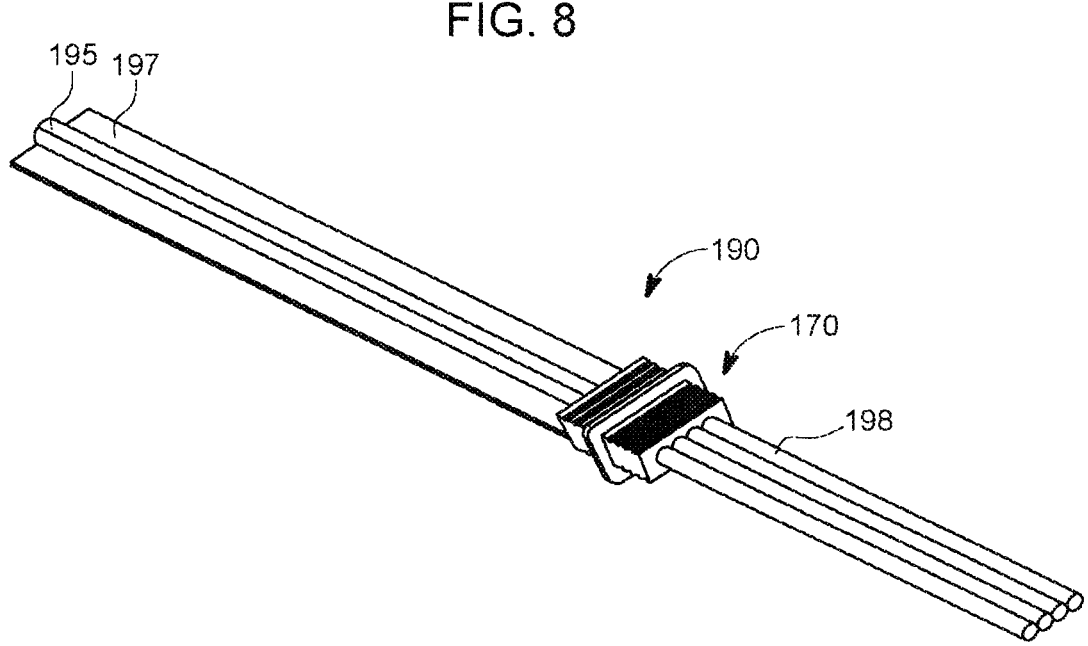
FIG. 9 is a perspective view of a light element according to an embodiment of the present invention.

In some embodiments, like those depicted in FIGS. 5-12, light assembly 130 may comprise a resilient, flexible diffusion housing 140 comprising a first housing portion 142 having a cavity or channel 148 extending throughout to length of the diffusion housing 140 for insertion of light element 190 therein. As shown in FIG. 9, light element 190 comprises light source 195, which may be a programable/nonprogrammable RGB LED or the like, disposed on FPC 197. Electrical communication between light element 190 and an external electrical power source is established via electrical fitment 170 and electrical connectors 198. Electrical fitment 170 comprises a lower electrical housing 172, upper electrical housing 174, and a limiting flange 175 therebetween. In the interior of the housing, electrical components are included for electrical wiring of electrical connectors 198 and light source 195 at connection ends 170*a* and 170*b*, respectively. Connection ends 170*a*, 170*b* may include electrical outlet members (not shown) for establishing a removable "plug-and-socket" style connection. Lower electrical housing 172 may include one or more projections 176 extending from the housing exterior which will deform the internal sidewalls of cavity 148 on the resilient diffusion housing 140, creating a locking frictional fit or detent mechanism between the electrical fitment 172 and the interior sidewalls forming diffusion housing cavity 148. Limiting flange 175 not only provides a mechanical stop/limiter on electrical fitment 170 to prevent over-insertion of the electrical fitment within the diffusion housing cavity 148, but also provides a weather-tight seal to prevent moisture or other damage or malfunction to the light element 190. While optional, the electrical fitment may be further weather-sealed within the diffusion housing cavity with an adhesive, such as an epoxy or the like.

Figure 11:
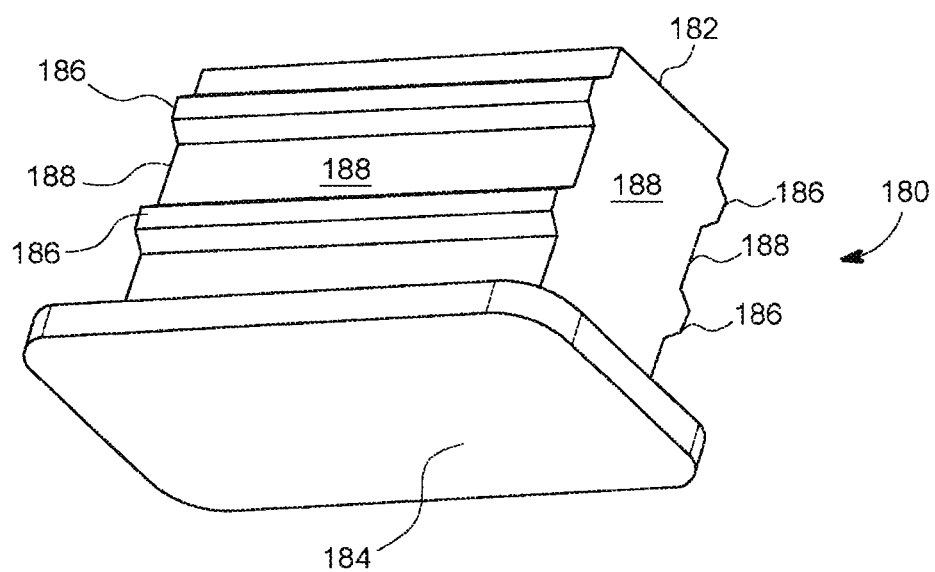
FIG. 11 is a perspective view of a diffusion housing endcap according to an embodiment of the present invention.
Figure 12:
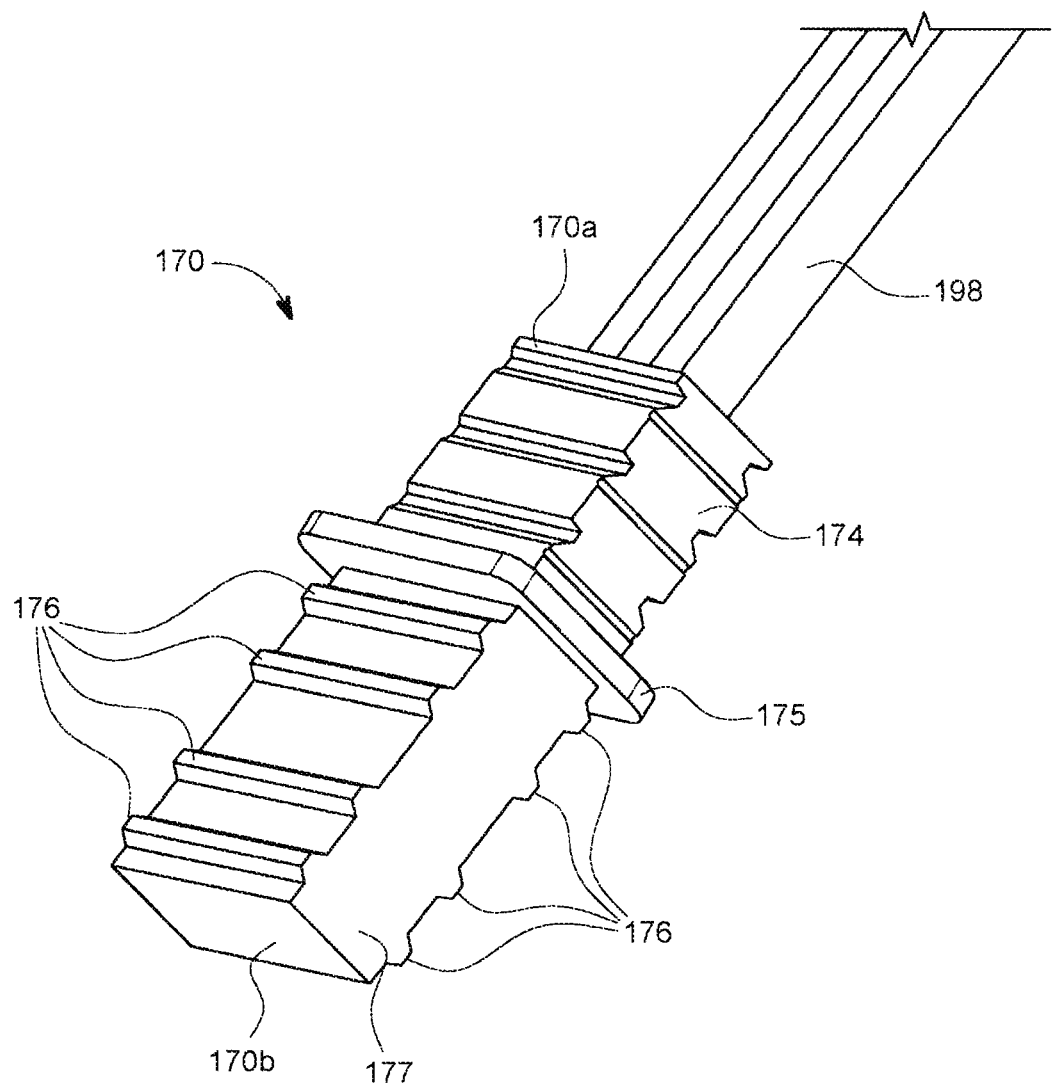
FIG. 12 is a perspective view of a diffusion housing electrical fitment according to an embodiment of the present invention.
Figure 13:
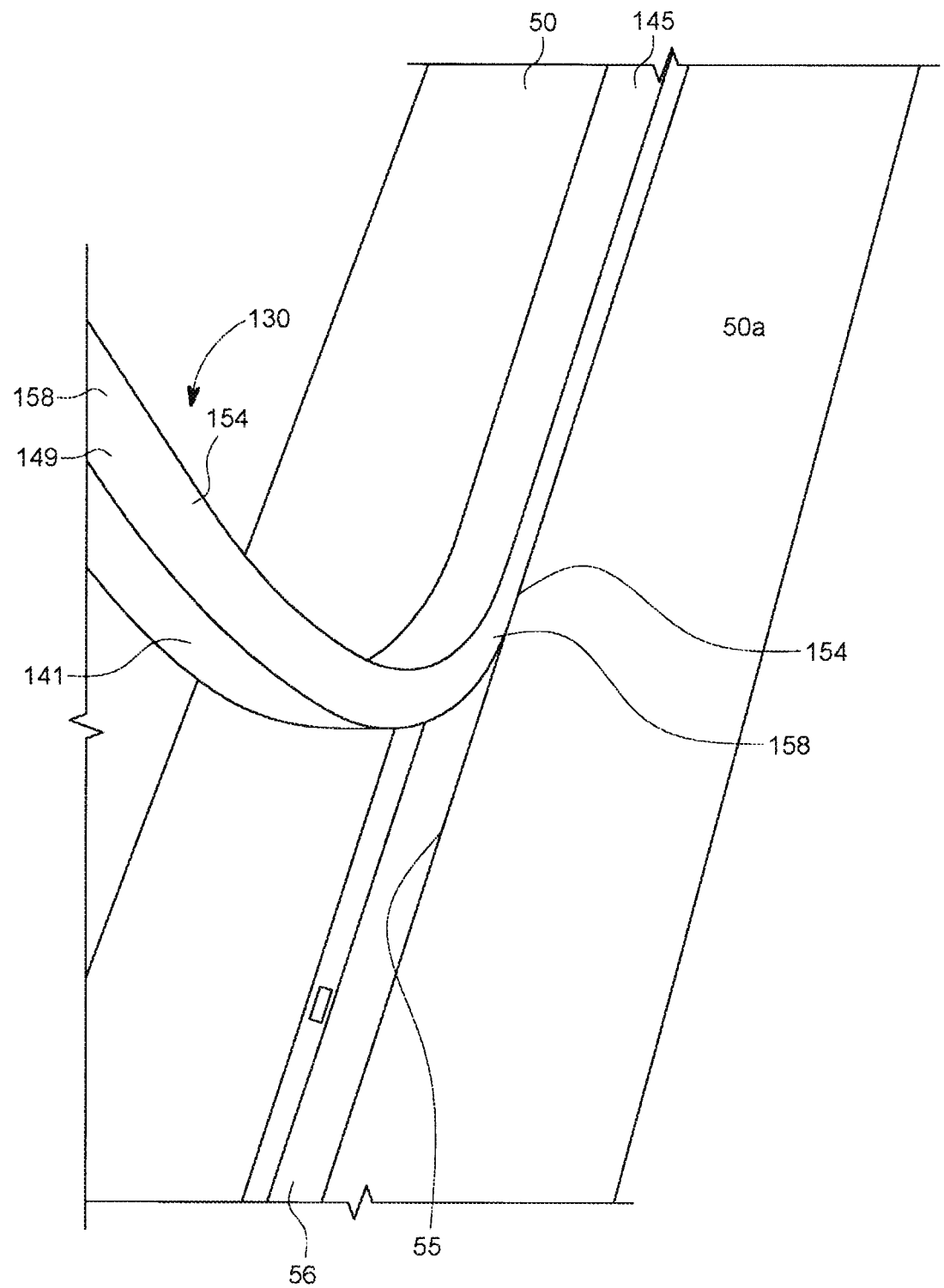
FIG. 13 is a perspective view of a light assembly according to an embodiment of the present invention, during the method of installation on a surface in a wet or outdoor environment.
Figure 14:
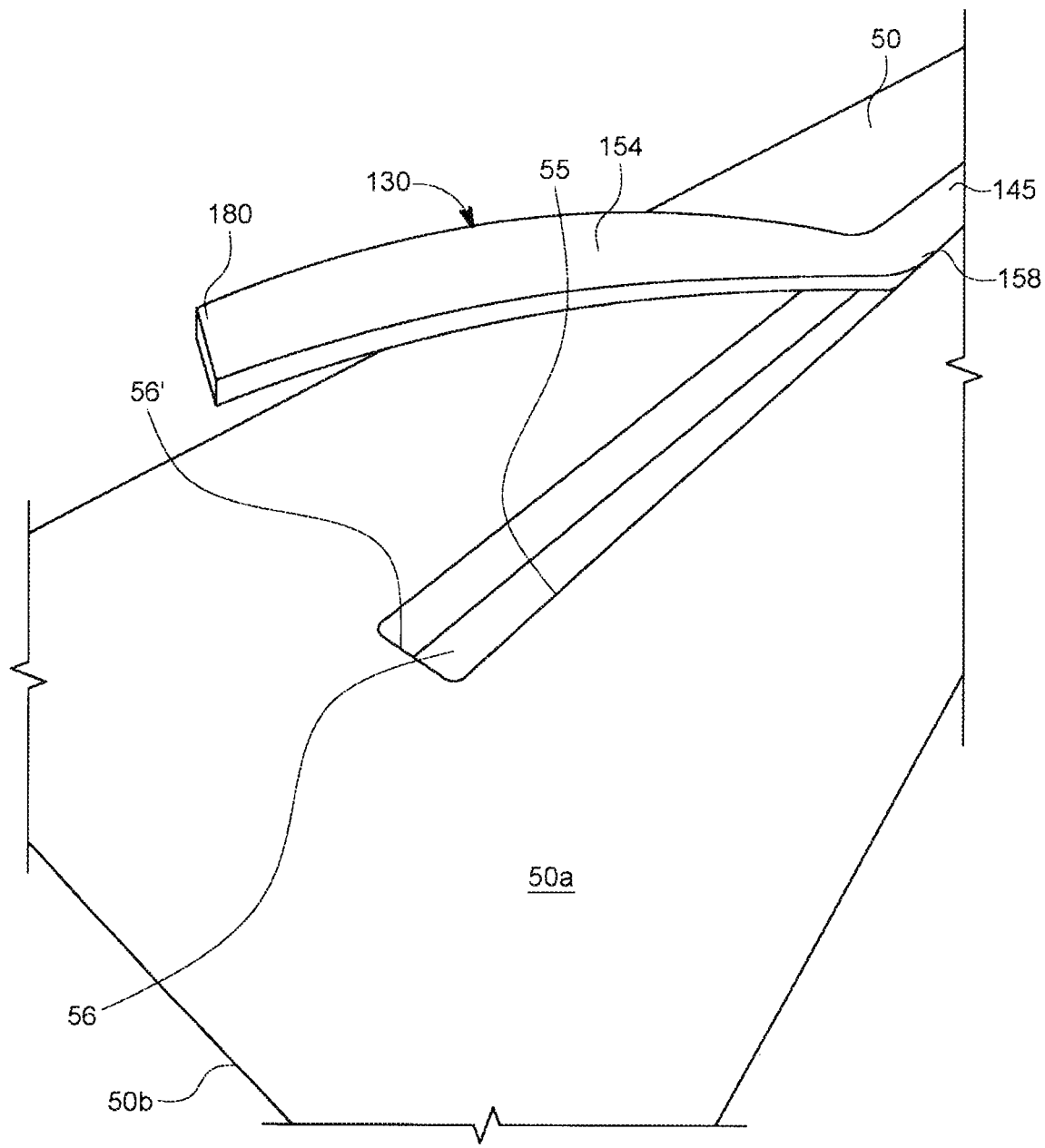
FIG. 14 is a perspective view of a light assembly according to an embodiment of the present invention, during the method of installation on a surface in a wet or outdoor environment.
Figure 15:
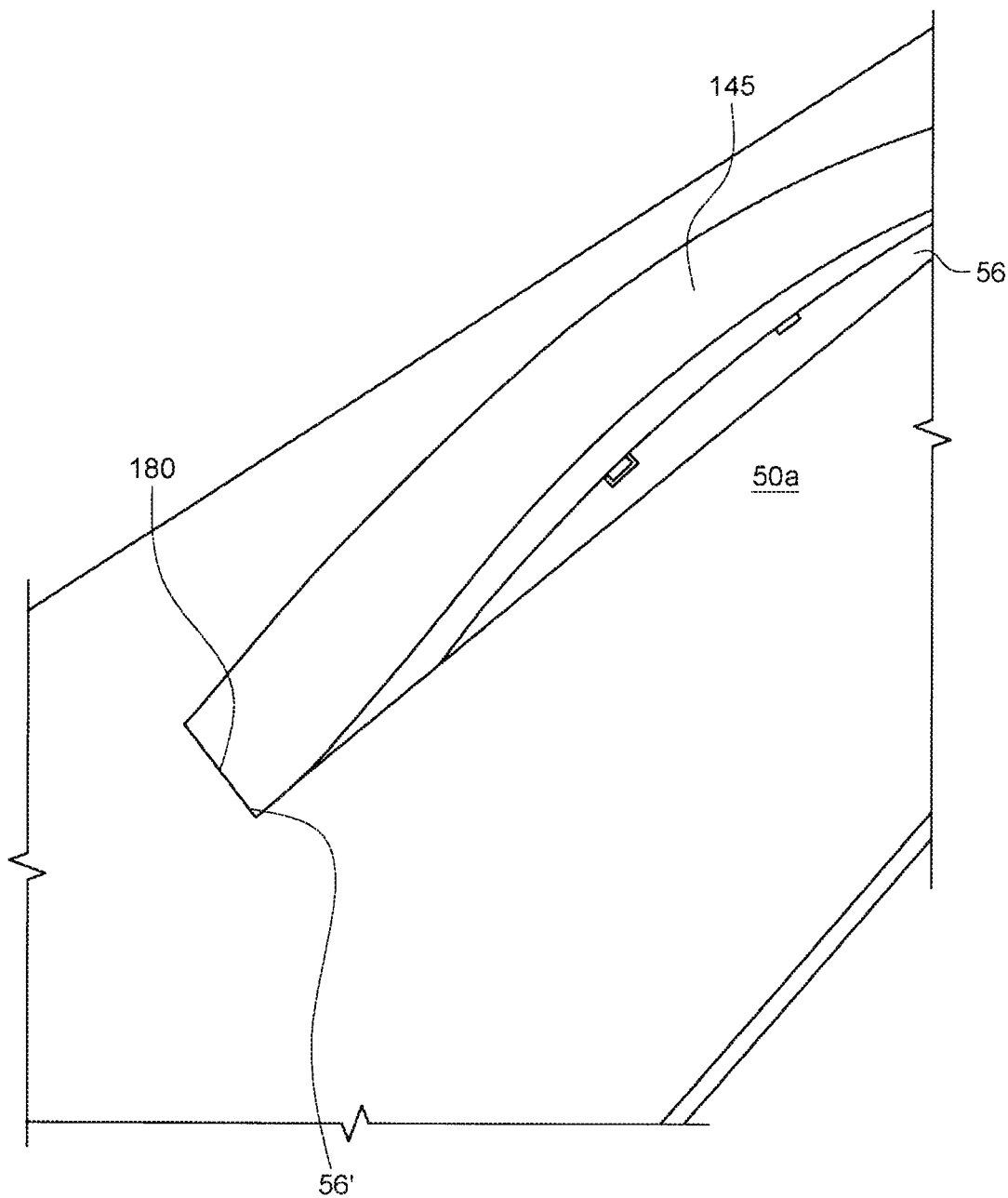
FIG. 15 is a perspective view of a light assembly according to an embodiment of the present invention, during the method of installation on a surface in a wet or outdoor environment.

Opposing the diffusion housing end with inserted electrical fitment 170, light assembly 130 may comprise an endcap 180 (as shown in FIG. 11) comprising a flanged base 184 with an extension member 182 formed from sidewalls 188 extending from flanged base 184. One or more projections 186 extend from one or more sidewalls 188 of endcap 180 to form a detent mechanism between endcap 180 and diffusion housing cavity 148 in a manner akin to that formed by electrical fitment 170, with flanged base 184 sealing diffusion housing cavity 148 in a manner similar to that of limiting flange 175. While the connective schemes of electrical fitment 170 and endcap 180 with diffusion housing cavity 148 are similarly described above, other connective schemes which would provide a weather-tight seal are not meant to be precluded.

Figure 10:
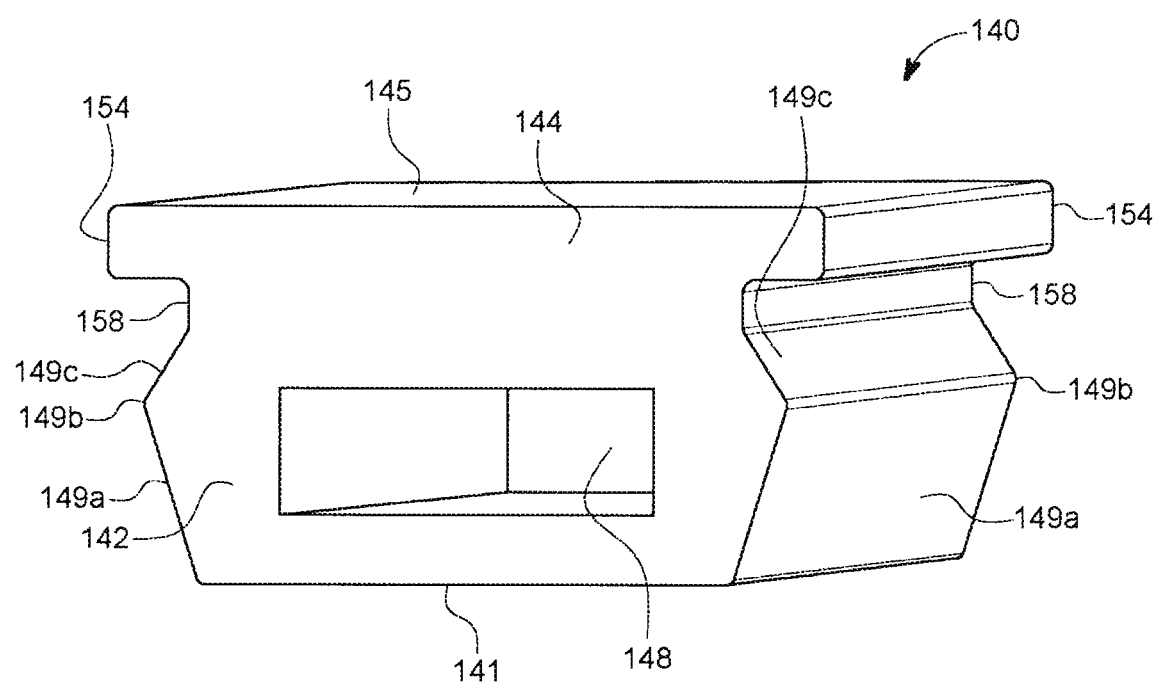
FIG. 10 is a perspective view of a diffusion housing according to an embodiment of the present invention.

Turning now to FIGS. 7, 8, and 10, diffusion housing 140 may be further described as follows. Second housing portion 144 includes diffusion emission base 145 having a connection flange 154 and with groove 158 formed between the second housing portion and first housing portion 142. First housing portion 142 includes cavity 148 for placement of the light element 190 therein, as well as a resilient registration vertex 149*a*, between sloping regions 149*b*, 149*c*. While the angle of the sloping regions forming registration vertex 149*a* in the exemplary figures is shown as an obtuse, any angle which would create a vertex on the first housing portion 142 are not meant to be precluded. Similarly, while the registration vertex 149*a* and sloping regions 14*b*, 149*c* form a hexagonal cross-sectional geometry of the first housing portion 142, other cross-sectional geometries are not meant to be precluded. After installation and sealing of the light element within cavity 148 via endcap 190 and electrical fitment 170, light element 190 is completely encapsulated within first housing portion and isolated from second housing portion 144.

Figure 16:
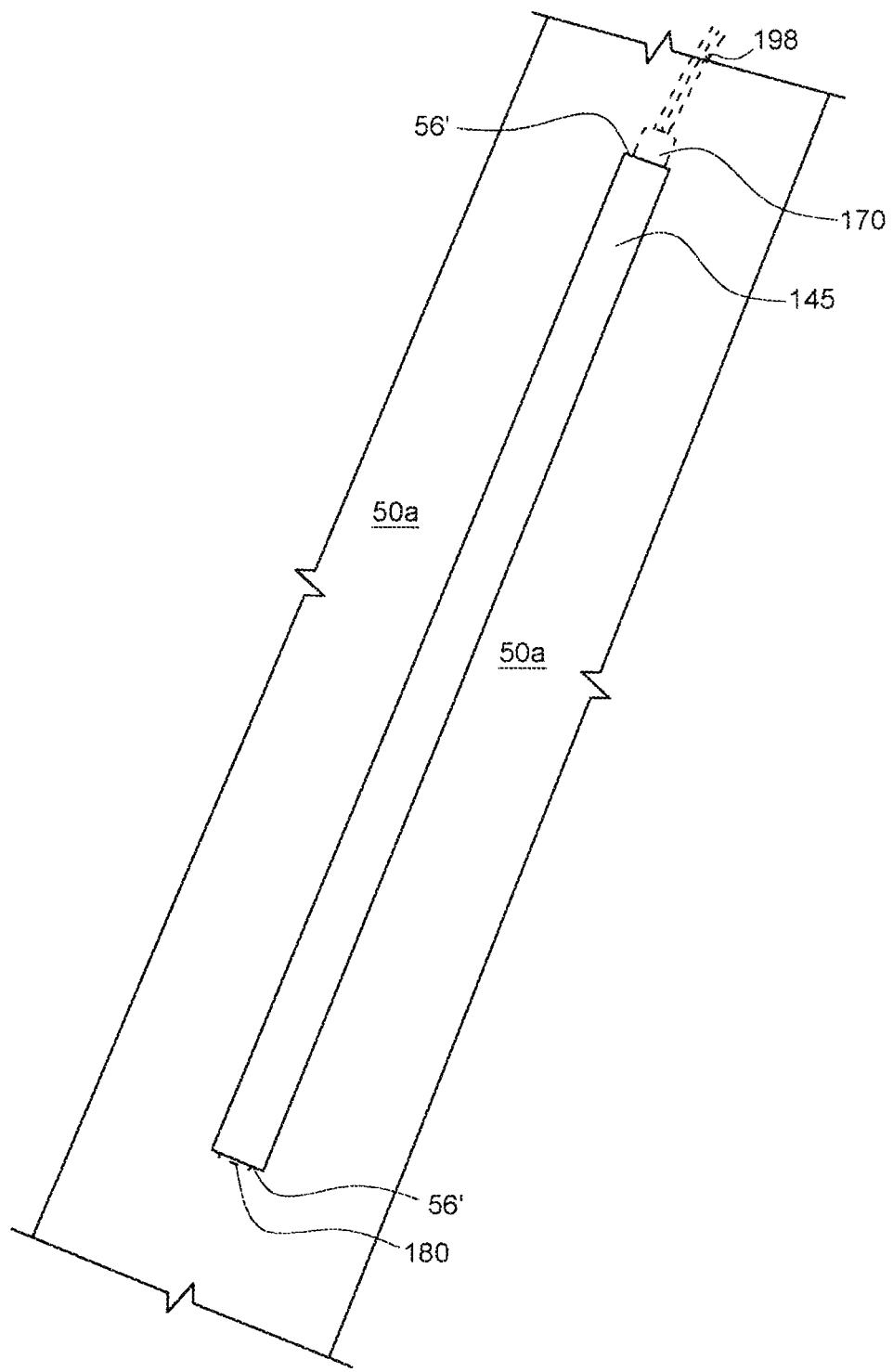
FIG. 16 is a perspective view of a light assembly according to an embodiment of the present invention, after installation on a surface in a wet or outdoor environment.
Figure 17:
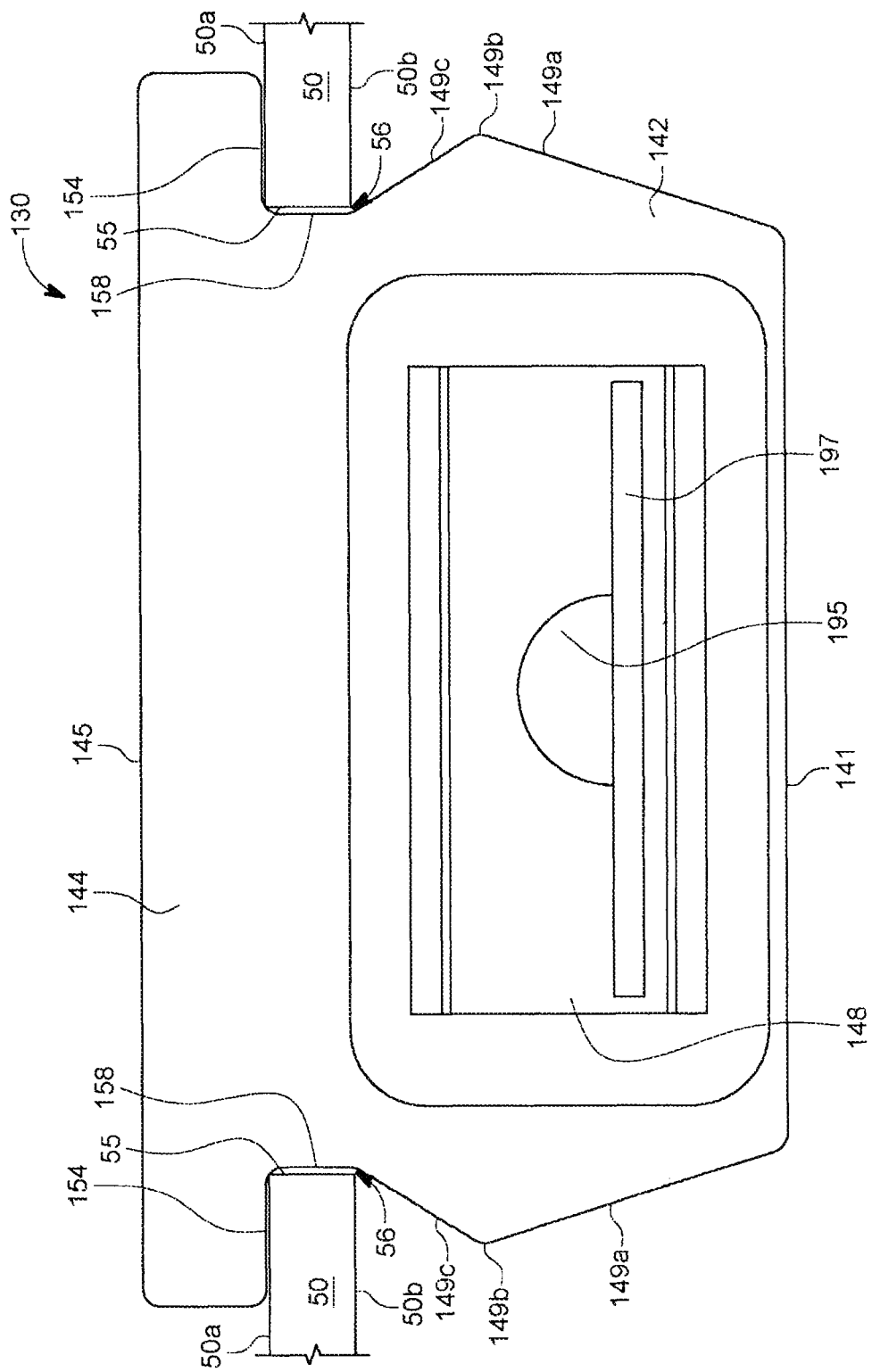
FIG. 17 is a cross-sectional view of the light assembly of FIG. 15.

Turning now to FIGS. 13-17, the method of installing of a completed light assembly 130 on a surface 50 of a marine craft or recreational vehicle is described. Surface 50 comprises an exterior surface 50*a* and interior surface 50*b*, which houses mechanicals, framework, electrical components, and the like of the vessel. A slot 56 is cut, drilled, or otherwise created through the surface 50 having dimensions comparable to that of the light assembly 130 being installed. Electrical connectors 198 are connected with the vessel external power source located within the vessel interior surface 50*b*, and the end of light assembly 130 comprising the electrical fitment is placed within slot 56 at one end 56' such that the first housing portion 142 is located on the interior surface 50*b*, with second housing portion 144 on the exterior surface 50*a*. With reference to FIG. 17, light assembly 130 when properly installed in the surface slot 56 engages the connection flange 154 on exterior surface 50*a*, preventing second housing portion 144 from entering the interior surface 50*a* by way of gravity, bumping, or the like. Slot edge 55 may additionally register with groove 158, and may further be secured with adhesives to prevent malfunctioning of light assembly 130 due to weathering or moisture.

A section of the diffusion housing 140 is placed within the slot 56 starting with diffusion housing bottom surface 141, and pressed down through slot 56 in the direction of interior surface 50*b*. Due to the resilient structure of the diffusion housing, the exterior surfaces at 149*a*, 149*b*, and 149*c* of the diffusion housing 140 may deform, providing a resilient feedback as the housing is pressed through slot 56, the extent to which may be mitigated to the installer by way of sloping region 149a. After plunging registration vertex 149b within slot 56, diffusion housing will begin to flex, return again to the undeformed shape. In some embodiment of the present invention, like those comprising sloping region 149b, resilient feedback to the installer will decrease, providing a tactile feedback to the installer when the slot edge 55 is adjacent groove 158 of the light assembly 130, indicating a fully-installed position.

The installer may continue to provide downward pressure along the length of light assembly 130 to ensure fully receipt of the diffusion housing first portion 142 within slot 56. To facilitate engagement, the installer may press downwardly from the light assembly top surface or emission base 145. In some embodiments, after securing a portion of the length of light assembly 130 within slot 56 in one direction, the installer may then secure the portion of light assembly 130 having endcap 180 within the second slot end 56' opposing the first slot end 56' having electrical fitment 170 installed therein. After receipt of the endcap 180 within slot end 56', the installer may then continue to apply downward pressure to the length of the light assembly 130 to secure it in the first direction (towards endcap 180) or begin to secure the light element within the slot in the opposite direction (towards electrical fitment 170). Similarly, while the embodiments described herein describe installation beginning with the end of the light element closest to electrical fitment 170, such installation is exemplary, and a person of skill in the art would understand light assembly 130 may be installed within slot 56 in any manner which would provide for complete registration of the light assembly 130 with the vessel surface 50. Similarly, while the methods of installation described herein are directed to the embodiments incorporating the light assembly 130, a person of skill in the art should understand that the method of installation should not be so precluded, and any of the aforementioned embodiments utilize the methods of installation described herein.

The light element(s) of the embodiments of the present invention may be installed within automobiles, marine vessels, recreational vehicles (RVs), or any other surface requiring illumination, such as docks, ramps, stairways, display surfaces for public or commercial displays, etc. The present invention advantageously provides for simple installation of light elements without need for brackets, fasteners, or other additional parts to hold the light element in place. The light elements described herein can comprise red-green-blue (RBG) LEDs, red-green-blue-white (RGBW) LEDs, or LEDs or other light-providing electronics having individual color to meet the illumination requirements of the original equipment manufacturer (OEM), or after-market individual.

A completed installation of the light assembly 130 is depicted in FIG. 16, showing diffusion housing top surface 145 projecting from exterior surface 50a, covering slot 56 and preventing visibility of interior surface 50b. The installed light assembly 130 provides diffused illumination projecting from the surface 50, which may be programmed, operated, or controlled by an end user. Advantageously, only the second housing portion of light assembly 130 projects from the surface 50 which is visible, preventing the view or potential damage or malfunction of the light element within the diffusion housing since the first portion of the housing, which includes the endcap, electrical fitment, and electrical connectors, is now connected to the external power source and sealed within the interior portion of the surface. Thus, the method of installing the light assembly of the present invention provides for a plumb, near-continuous installed surface, as only the diffusion housing top surface 145 is visible. In addition, due the construction of the diffusion housing, a secure connection is provided while simultaneously reducing installation time and cost. Further, the diffusion housing of the present invention provides for a well diffused light source, significantly reducing the number of "hot spots" and "dark zones" characteristic of illumination produced by comparable light sources.

While the present invention depicts only the installation of a single light assembly, a person of skill in the art would understand that the present invention could install a plurality of light assemblies to a single external power source. In some embodiments, endcap 180 may instead be replaced with a second electrical fitment (not shown), such that a second lighting assembly may be electrically connected to the first installed light assembly (in series or parallel), to provide for multiple lighting assemblies on one or more surfaces in a wet or outdoor environment, such as surfaces of a marine vessel or land recreational vehicle.

Thus, the present invention provides one or more of the following advantages: a light assembly which can emit a properly diffused and consistent light source; a faster, easier, and less costly method of installing a light assembly; a light assembly which can be installed without specialized tools or mounting components; a light assembly which provides a seamless, virtually continuous installation surface; and a light assembly which can be installed on a surface in a wet or outdoor environment without failure.

While the present invention has been particularly described, in conjunction with one or more specific embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A light assembly for installation on a surface in a wet or outdoor environment comprising:
a flexible diffusion housing comprising a first housing portion, a second housing portion, and a groove therebetween;
the first housing portion including open ends and a cavity extending therebetween, the first housing portion having a resilient registration vertex between a plurality of sloping regions forming a maximum width of the first housing portion;
a light element disposed in the cavity and encapsulated therein; and
the second housing portion including an emission base forming an uppermost surface of the flexible diffusion housing when the flexible diffusion housing is in an installed position, said second housing portion having a connection flange extending transverse to the cavity and having a width that is greater than the maximum width of the first housing portion;
wherein in the installed position light produced by the light element is emitted towards the emission base and diffused by the first housing portion and second housing portion and emitted outwardly from the second housing portion.

2. The light assembly of claim 1, wherein the light element comprises a flexible circuit board having a bottom surface and a top surface with LEDs disposed thereon.

3. The light assembly of claim 1, wherein the first housing portion comprises a bottom surface, and wherein the light element is oriented within the first housing portion interior such that light is produced towards the second housing portion emission base and away from the first housing portion bottom surface.

4. The light assembly of claim 1, wherein in the installed position the connection flange engages with an exterior of said surface, wherein in the installed position the diffusion housing groove registers with a slot edge below an exterior surface of said surface, and wherein in the installed position the first housing portion is within an interior of said surface.

5. The light assembly of claim 1, wherein the resilient registration vertex and the plurality of sloping regions form a hexagonal cross section of the first housing portion.

6. The light assembly of claim 2, wherein the light element comprises an electrical fitment including at least one projection and a limiting flange for forming a detent mechanism with an end of the first housing portion cavity, and wherein an opposing end of the cavity includes an endcap comprising a flanged base and at least one projection for forming a detent mechanism with the cavity opposing end.

7. The light assembly of claim 1, wherein the diffusion housing is constructed of a material which comprises a transparent, semi-transparent, or semi-opaque material.

8. The light assembly of claim 1, wherein the diffusion housing is constructed of a material comprising UV-blocking materials, pigments, or dyes.

9. A method of installing a light assembly on a surface in a wet or outdoor environment comprising:
providing a light assembly comprising a flexible diffusion housing and a light element encapsulated within a first portion of the flexible diffusion housing, the first portion including open ends and a cavity extending therebetween;
creating a slot on a surface in a wet or outdoor environment, the surface comprising an interior surface and an exterior surface;
selecting a section of the light assembly;
positioning the light assembly section adjacent the slot;
pressing the light assembly section into the slot such that a selected first portion of the diffusion housing is within the interior surface and a selected second portion of the diffusion housing is on the exterior surface such that an emission base forms an uppermost surface of the selected second portion of the diffusion housing and a connection flange extends transverse to a length of the slot, said connection flange having a width that is greater than a maximum width of the first portion of the flexible diffusion housing; and
securing the light assembly section within the slot of the surface by engaging a lower portion of the connection flange with the exterior surface;
wherein the diffusion housing comprises a groove between the first portion and the second portion of the diffusion housing, and wherein the diffusion housing groove registers with a slot edge below the exterior surface upon securing the light assembly section within the slot of the surface;
wherein the first portion of the diffusion housing comprises a resilient registration vertex between a plurality of sloping regions forming a maximum width of the first portion of the diffusion housing.

10. The method of claim 9, wherein electrical connectors of the light element are connected to an external power source on the interior surface and are not visible when viewed from the exterior surface after installation of the light assembly section.

11. The method of claim 9, wherein the resilient registration vertex which provides a resilient feedback upon pressing the selected first portion of the diffusion housing into the slot.

12. The method of claim 11, wherein the resilient feedback increases as the selected first portion of the diffusion housing is pressed into the slot and said slot edge approaches the resilient registration vertex, and wherein resilient feedback decreases as the resilient registration vertex of the selected first portion of the diffusion housing is pressed beyond the slot edge and into the interior surface.

13. The method of claim 9, wherein the method further comprises:
applying downward pressure on a top surface of the light assembly in a direction along a length of the light assembly; and
securing the length of the light assembly within the slot on the surface.

14. The method of claim 9, wherein the method further comprises:
selecting a second section of the light assembly at a light assembly end opposite the light assembly section;
positioning the light assembly second section adjacent the slot;
pressing the light assembly second section into the slot such that the first portion of the diffusion housing is within the interior surface and a second portion of the diffusion housing is on the exterior surface; and
securing the light assembly section within the slot of the surface.

* * * * *